US011018419B2

(12) United States Patent
Allouis et al.

(10) Patent No.: US 11,018,419 B2
(45) Date of Patent: May 25, 2021

(54) RADOME

(71) Applicant: HELLA GMBH & CO. KGAA, Lippstadt (DE)

(72) Inventors: David Allouis, Bad Iburg (DE); Wolfgang Nicke, Lörrach (DE); Heiko Schöne, Zell im Wiesental (DE); Herbert Wambsganss, Schopfheim (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 420 days.

(21) Appl. No.: 15/769,131

(22) PCT Filed: Sep. 23, 2016

(86) PCT No.: PCT/EP2016/072658
§ 371 (c)(1),
(2) Date: Apr. 18, 2018

(87) PCT Pub. No.: WO2017/067740
PCT Pub. Date: Apr. 27, 2017

(65) Prior Publication Data
US 2018/0301797 A1 Oct. 18, 2018

(30) Foreign Application Priority Data
Oct. 19, 2015 (DE) ................. 10 2015 220 346.8

(51) Int. Cl.
*B60R 13/00* (2006.01)
*H01Q 1/42* (2006.01)
(Continued)

(52) U.S. Cl.
CPC ............. *H01Q 1/42* (2013.01); *B60R 13/005* (2013.01); *H01Q 1/3233* (2013.01); *H01Q 15/14* (2013.01); *H01Q 1/3283* (2013.01)

(58) Field of Classification Search
CPC .......... G01S 7/032; G01S 2013/93271; H01Q 1/3283; H01Q 1/42; H01Q 1/3233;
(Continued)

(56) References Cited

U.S. PATENT DOCUMENTS 6,184,842 B1   2/2001   Leinweber et al.
9,099,782 B2   8/2015   Ziolkowski
(Continued)

FOREIGN PATENT DOCUMENTS

CN   1822433 A     8/2006
CN   101441361 A   5/2009
(Continued)

OTHER PUBLICATIONS

International Search Report, PCT/EP2016/072658, dated Dec. 19, 2016, 3 pgs.
(Continued)

*Primary Examiner* — Rajarshi Chakraborty
*Assistant Examiner* — Fatima N Farokhrooz
(74) *Attorney, Agent, or Firm* — Paul D. Strain, Esq.; Strain & Strain PLLC

(57) ABSTRACT

The invention relates to a radome having a substantially extensive front plate the front face of which is transparent and the rear face of which is provided with an opaque layer, at least one cutout being provided in the opaque layer and acting as a light passage, in particular for a radar sensor for a motor vehicle.

15 Claims, 8 Drawing Sheets

(51) Int. Cl.
*H01Q 1/32* (2006.01)
*H01Q 15/14* (2006.01)

(58) Field of Classification Search
CPC .......... H01Q 15/14; B32B 27/08; B32B 1/00;
B32B 3/08; B32B 3/30; B32B 3/263;
B32B 2307/41; B32B 2451/00; B32B
2590/00; B32B 2307/4023; B32B
2307/414; B32B 2307/416; B32B
2551/00; B32B 2250/44; B32B 2605/08;
B32B 2307/40; B32B 2307/412; B32B
2255/10; B32B 2255/205; F21S 41/30;
B60Q 1/0011; B60Q 1/2661; B60R
13/005; B60R 19/52; B60R 2019/525;
C23C 14/20; C23C 14/35; F21V 3/02;
F21Y 2115/10; F21W 2121/00
See application file for complete search history.

(56) References Cited

U.S. PATENT DOCUMENTS

| | | | | |
|---|---|---|---|---|
| 9,616,823 | B1* | 4/2017 | Salter | B60R 13/005 |
| 2002/0034070 | A1* | 3/2002 | Kumagai | H01H 13/702 |
| | | | | 362/23.15 |
| 2007/0031641 | A1* | 2/2007 | Frisch | B32B 15/08 |
| | | | | 428/172 |
| 2008/0088936 | A1* | 4/2008 | Tang | G02B 27/0172 |
| | | | | 359/630 |
| 2012/0140436 | A1* | 6/2012 | Yang | F21V 13/08 |
| | | | | 362/84 |
| 2012/0256543 | A1* | 10/2012 | Marcove | B60R 13/005 |
| | | | | 315/77 |
| 2012/0257373 | A1* | 10/2012 | Brandt | B60K 37/02 |
| | | | | 362/23.19 |
| 2015/0108478 | A1 | 4/2015 | Akimoto et al. | |
| 2017/0101047 | A1* | 4/2017 | Dellock | G09F 21/04 |
| 2017/0253194 | A1* | 9/2017 | Salter | B60R 13/005 |
| 2017/0276314 | A1* | 9/2017 | Hanulak | F21S 43/243 |
| 2017/0291536 | A1* | 10/2017 | Cannon | B32B 9/047 |
| 2017/0320532 | A1* | 11/2017 | Salvaggio, Jr. | F21K 9/64 |
| 2018/0294560 | A1* | 10/2018 | Allouis | H01Q 1/42 |
| 2018/0299532 | A1* | 10/2018 | Allouis | B60R 13/005 |
| 2018/0351242 | A1* | 12/2018 | Wambsganss | H01Q 1/42 |

FOREIGN PATENT DOCUMENTS

| | | |
|---|---|---|
| CN | 203300797 U | 11/2013 |
| CN | 103422452 A | 12/2013 |
| CN | 104094133 A | 10/2014 |
| DE | 198 19 709 A1 | 11/1999 |
| DE | 20 2012 002 178 U1 | 4/2012 |
| DE | 10 2013 016 667 A1 | 7/2014 |
| DE | 10 2015 004 204 A1 | 8/2015 |
| DE | 20 2015 102 310 U1 | 8/2015 |
| EP | 0 954 052 A2 | 11/1999 |
| EP | 0 954 052 A3 | 9/2002 |
| EP | 2 208 645 A1 | 7/2010 |
| JP | 4790095 B1 | 10/2011 |
| WO | WO 2008/123896 A3 | 10/2008 |

OTHER PUBLICATIONS

German Search Report, Appl. No. 10 2015 220 346.8, dated May 24, 2016, 7 pgs.

Allouis, U.S. PTO Office Action, U.S. Appl. No. 15/767,434, dated Oct. 22, 2019, 21 pgs.

* cited by examiner

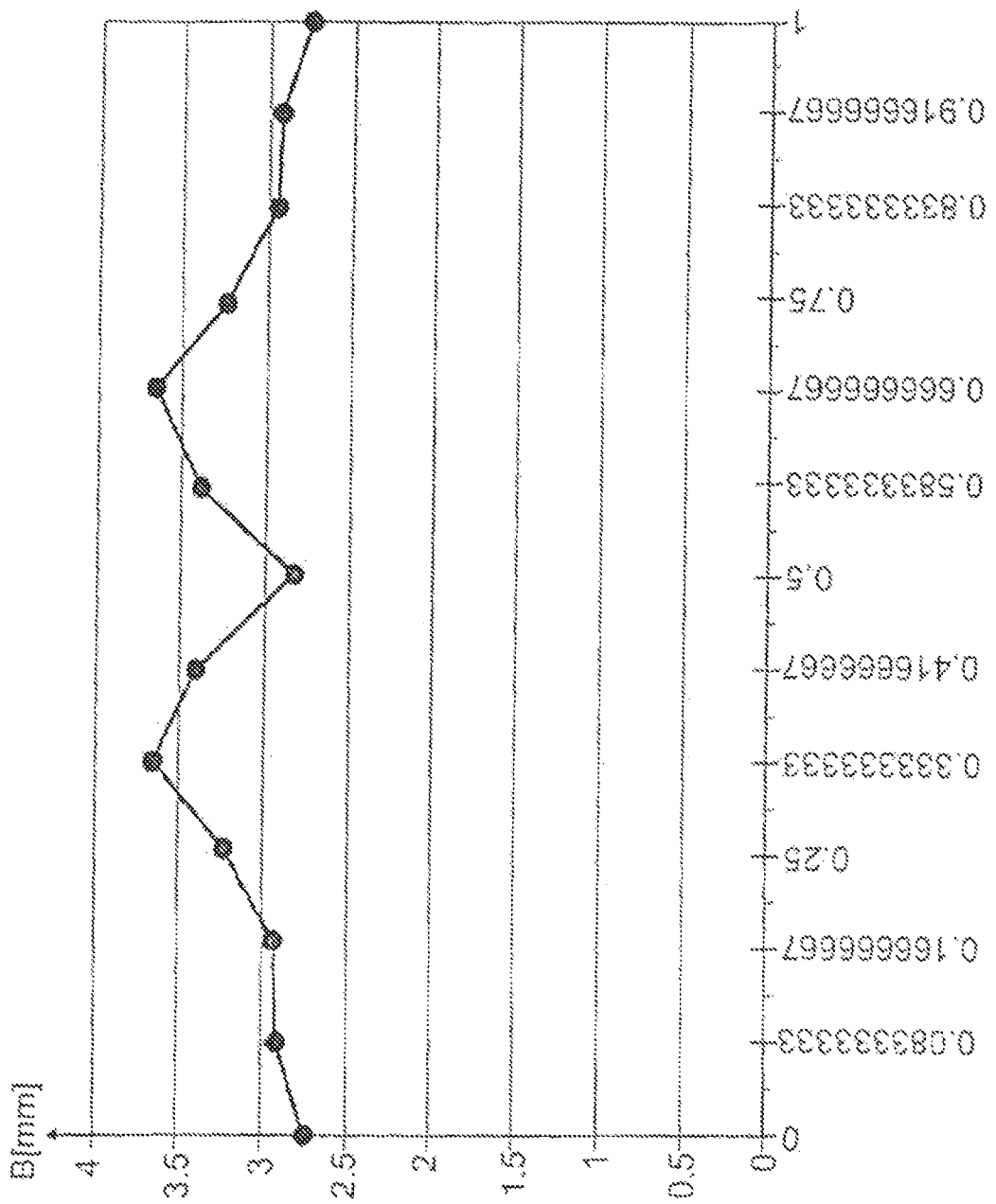

RADOME

CROSS-REFERENCE TO RELATED PATENT APPLICATIONS

This application is a National Stage of International Application No. PCT/EP2016/072658, filed Sep. 23, 2016, which is based upon and claims the benefit of priority from prior German Patent Application No. 10 2015 220 346.8, filed Oct. 19, 2015, the entire contents of all of which are incorporated herein by reference in their entirety.

Technical Field

The invention relates to a radome, in particular for a radar sensor for a motor vehicle.

Prior Art

Radomes are covering elements or covering plates that cover a radar transmitter or radar sensor which emits radar waves. These radomes are used in motor vehicles to protect such radar transmitters, for example of radar distance warning systems arranged in the vehicle front, from the influence of weather and from damage, such as falling rocks or precipitation, wherein the radome must at the same time also satisfy visual requirements of the vehicle manufacturer, because it is integrated in the vehicle front and helps define the appearance of the vehicle. Radomes of this type have become known for example from DE 198 19 709 A1.

In a radome, it is furthermore essential that it is at least substantially transparent for electromagnetic radiation in the longwave wavelength range, wherein it is advantageous that it is at least regionally opaque in the optically visible wavelength range. This transparency is achieved by way of coatings or lacquers, such that materials which are transparent in the optically visible wavelength range are opaquely covered and thus become non-transparent. As a result, visible three-dimensional structures can be produced, which can also be used as brand symbols, for example.

Inserted to this end is a radome having a front plate which has a front surface on its front side and a rear-side surface on its rear side. The front side can here be formed by a transparent material which can be coated and covered from the rear side so that optically visible structures can be produced.

Such visible structures, however, are not always easily detectable in particular in the dark or in poor visibility.

Representation of the Invention, Object, Solution, Advantages

It is the object of the invention to provide a radome which is easy to manufacture and yet exhibits a defined optical effect, in particular also in the dark and in poor visibility.

The object is achieved by way of the features of claim 1.

An exemplary embodiment of the invention relates to a radome having a substantially extensive front plate, which is configured to be transmissive on the front side and which is provided on the rear side with a layer that does not transmit light, wherein at least one cutout in the form of a light passage is formed in the layer that does not transmit light, having a reflective region of the extensive front plate, wherein the reflective region is arranged next to the cutout, having at least one substantially extensive light guide which is arranged on the rear side at the layer that does not transmit light, and having at least one light-emitting element which is coupled to the light guide such that light enters the light guide and such that the light propagates through the at least one light guide, wherein at least one diffuser element is arranged at the at least one light guide, which diffuser element is arranged such that the light propagating through the at least one light guide enters the diffuser element, propagates through the diffuser element, and exits the diffuser element and enters the transmissive front plate at the at least one light passage and is possibly reflected at the reflective region such that it exits the front plate on the front side, wherein the diffuser element has a modulated extension.

It is particularly advantageous here if an extensive light guide or a plurality of extensive light guides are provided, wherein assigned to each light guide is at least one light-emitting element, preferably more than one light-emitting element, which is coupled to the light guide for feeding light into the light guide. By way of the arrangement of the at least one light-emitting element or the plurality of light-emitting elements, uniform lighting with good brightness of the light-emitting structure is furthermore achieved. If the light guide has a rather elongate shape, two light-emitting elements are advantageous, for example, which are rather arranged in the end regions or corner regions of the rather elongate light guide. If the light guide has a rather compact structure, one light-emitting element may also suffice.

It is particularly advantageous if the diffuser element is arranged at an outer periphery of the light guide and in particular rests against it. As a result, improved lighting of the light-emitting structure can be achieved which is produced by the configuration of the cutout.

It is particularly advantageous here if the diffuser element engages around the perimetric outer periphery of the light guide. It is thus possible to obtain an at least partial or complete border, with the result that perimetric or partially perimetric light-emitting structures of the radome are obtained.

It is particularly advantageous here if the diffuser element is formed from bars and has a frame-type shape, wherein the bars enclose a surface. It is thus possible for a surface of a light guide to be held in a defined manner if the bar or bars define and border a surface.

It is particularly advantageous here if at least a first bar has, along its longitudinal extent, a modulated extension in the direction perpendicular to the longitudinal extent. In particular an extension in the plane of the light guide is modulated here such that defined scattering of the light up to the cutout or to the reflective region is obtained. This results in uniform lighting in the longitudinal direction or along the extent of the cutout.

It is also advantageous here if the first bar, in particular having a modulated extension in the direction perpendicular to its longitudinal extent, has a curvature or forms an arc. The longitudinal extent is defined here in the direction of its extent. A curved bar can also be modulated here in the direction perpendicular to the extension, such that in particular a modulated width is obtained.

It is also particularly advantageous if a second bar has a straight configuration or is formed from two straight partial bars that enclose an angle between them. It is possible hereby to obtain a corresponding geometry of the entire cutout and thus of the light-emitting structure.

In accordance with a further advantageous idea, it is advantageous if the light guide is made of a transparent plastics material and the diffuser element is made of a translucent plastics material.

It is also expedient if the light guide and the diffuser element are placed to be next to one another in the form of separately configured parts. It is thus possible to achieve individual production.

Alternatively, it is also advantageous if the light guide and the diffuser element are arranged as interconnected parts in neighboring fashion, for example are interconnected in particular by way of injection molding or adhesive bonding.

It is also advantageous if a rear-side cover is provided which covers the light guides and any diffuser elements arranged on the rear side of the front plate.

Further advantageous configurations are described by the following description of the figures and by the dependent claims.

BRIEF DESCRIPTION OF THE DRAWINGS

The invention will be explained in more detail below on the basis of at least one exemplary embodiment with reference to the drawings, in which:

FIG. 9 shows a diagram for illustrating the modulation of the width of a bar in a direction perpendicular to its longitudinal direction.

PREFERRED EMBODIMENT OF THE INVENTION

Figure 1:
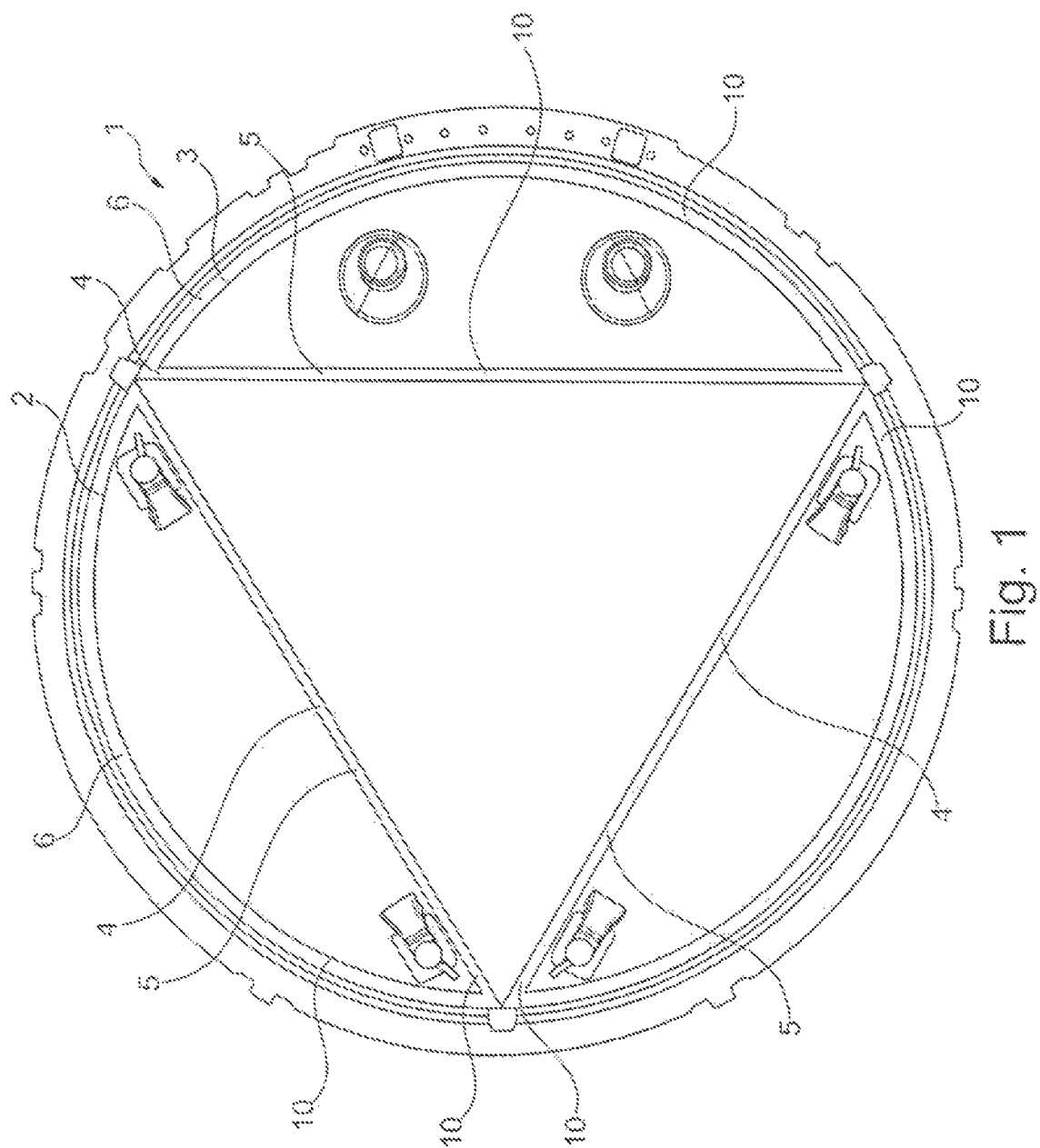
FIG. 1 shows a schematic view of a radome from the front side.

FIG. 1 shows a radome 1 from a front side. The radome 1 here has a substantially extensive front plate 2, whose front side is configured to be transmissive and whose rear side is provided with a layer 3 that does not transmit light, see also FIG. 6. At least one cutout 4 in the form of a light passage 10 is formed here in the layer 3 that does not transmit light. The cutout 4 that is in the form of a light passage 10 is configured in FIG. 1 in the manner of a triangle made from three straight bars 5 of the cutout 4, which has an annular border 6. The bars can here also have an angled design, such as for example centrally angled.

At least one substantially extensive light guide 7 is arranged on the rear side of the front plate 2 of the radome 1.

Figure 2:
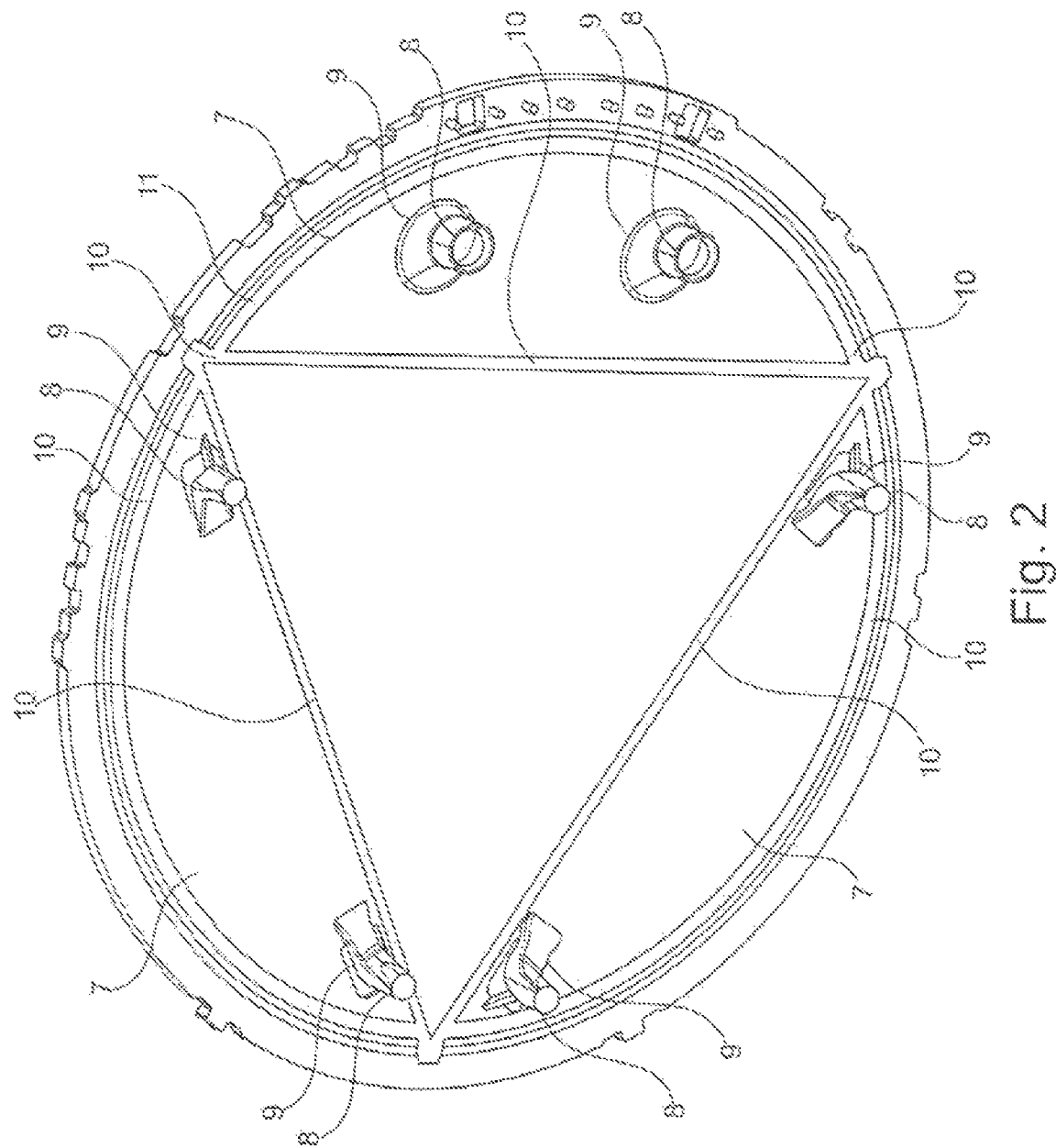
FIG. 2 shows a schematic view of a radome from the rear side.

FIG. 2 shows that in this exemplary embodiment, three extensive light guides 7 are arranged, which are arranged on the rear side at the layer 3 that does not transmit light. In other exemplary embodiments, other configurations with a different number of light guides can be provided.

Preferably provided per light guide 7 is furthermore at least one light-emitting element 8, which is coupled to an input coupling element 9 of the light guide 7 to couple light into the substantially extensive light guide 7. The respective light-emitting element 8 is coupled to the respective light guide such that light enters the light guide 7 at the input coupling element and that the light propagates through the at least one light guide 7, is reflected at a reflective region of the front plate, and enters the transmissive front plate 2 at the at least one light passage 10 such that it exits the front plate 2 on the front side and the illumination effect becomes visible.

It can be seen here that at least one diffuser element 11 is arranged optionally at the at least one light guide 7, which diffuser element 11 is arranged such that the light propagating through the at least one light guide 7 enters the diffuser element 11, propagates through the diffuser element 11 and exits the diffuser element 11 again and is reflected at the reflective region of the front plate 2 and enters the transmissive front plate 2 at the at least one light passage 10 such that it exits the front plate 2 on the front side and the illumination effect becomes visible.

Figure 3:
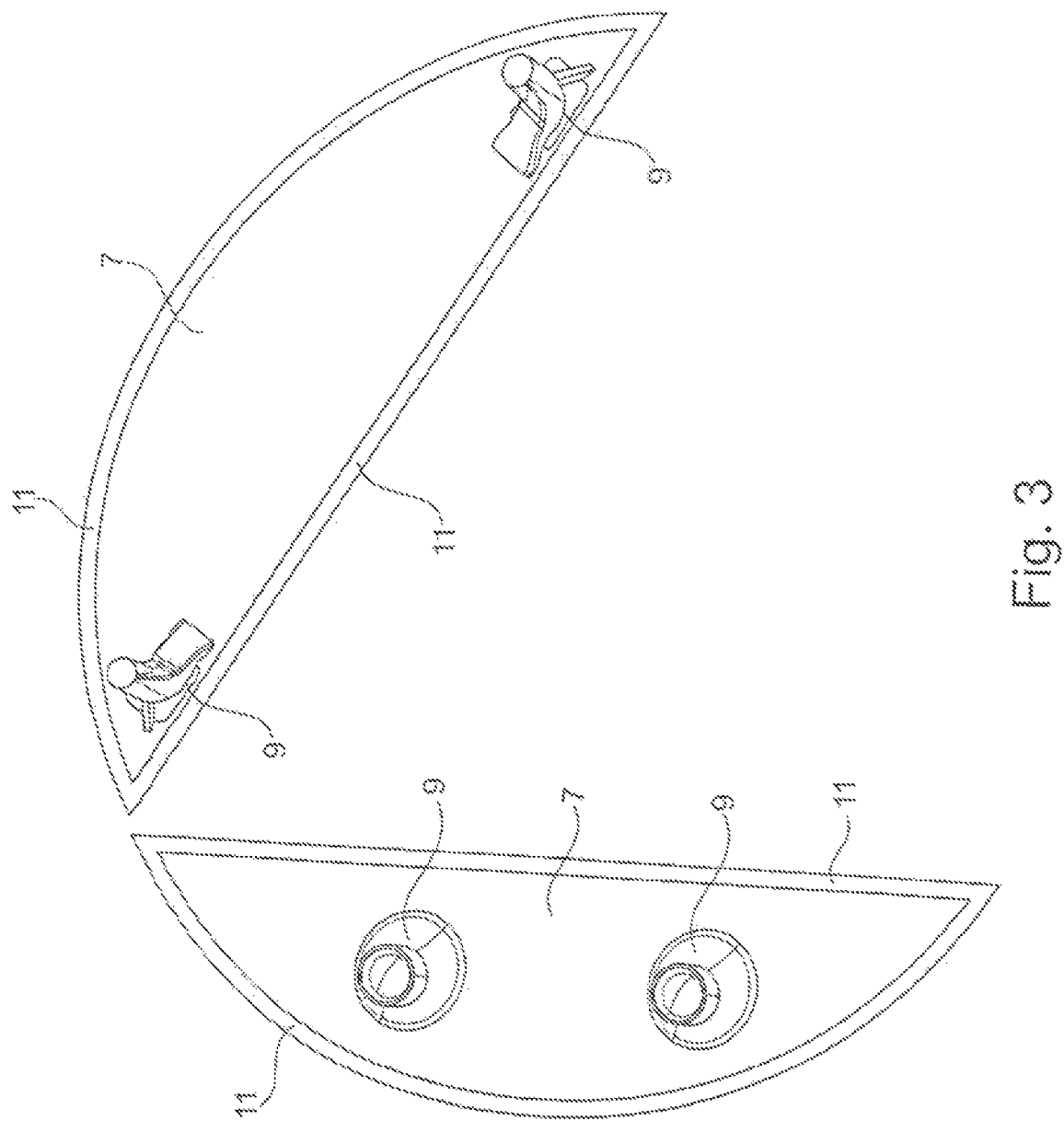
FIG. 3 shows two light guides having diffuser elements that surround them in each case.

FIG. 3 shows two extensive light guides 7, which are configured approximately like segments of a circle, which can in particular be configured to be flat or curved. Such extensive light guides 7 can be provided individually, or a plurality of such extensive light guides can be provided. In the example of FIGS. 1 and 2, three such light guides 7 are provided. At least one light-emitting element 8 is assigned here to each of the light guides 7, wherein with preference also more than one light-emitting element 8, such as two light-emitting elements 8, can be assigned, which can be placed on the input coupling elements 9 such that the light-emitting elements 8 are coupled to the light guide 7 for feeding light into the light guide 7. The input coupling elements 9 are here of quite different configuration, as is shown in FIG. 3. They are preferably arranged per light guide 7 at a distance from one another.

In accordance with an exemplary embodiment, at least one diffuser element 11 is assigned to at least one of the light guides 7 or advantageously to each of the light guides 7.

Figure 4:
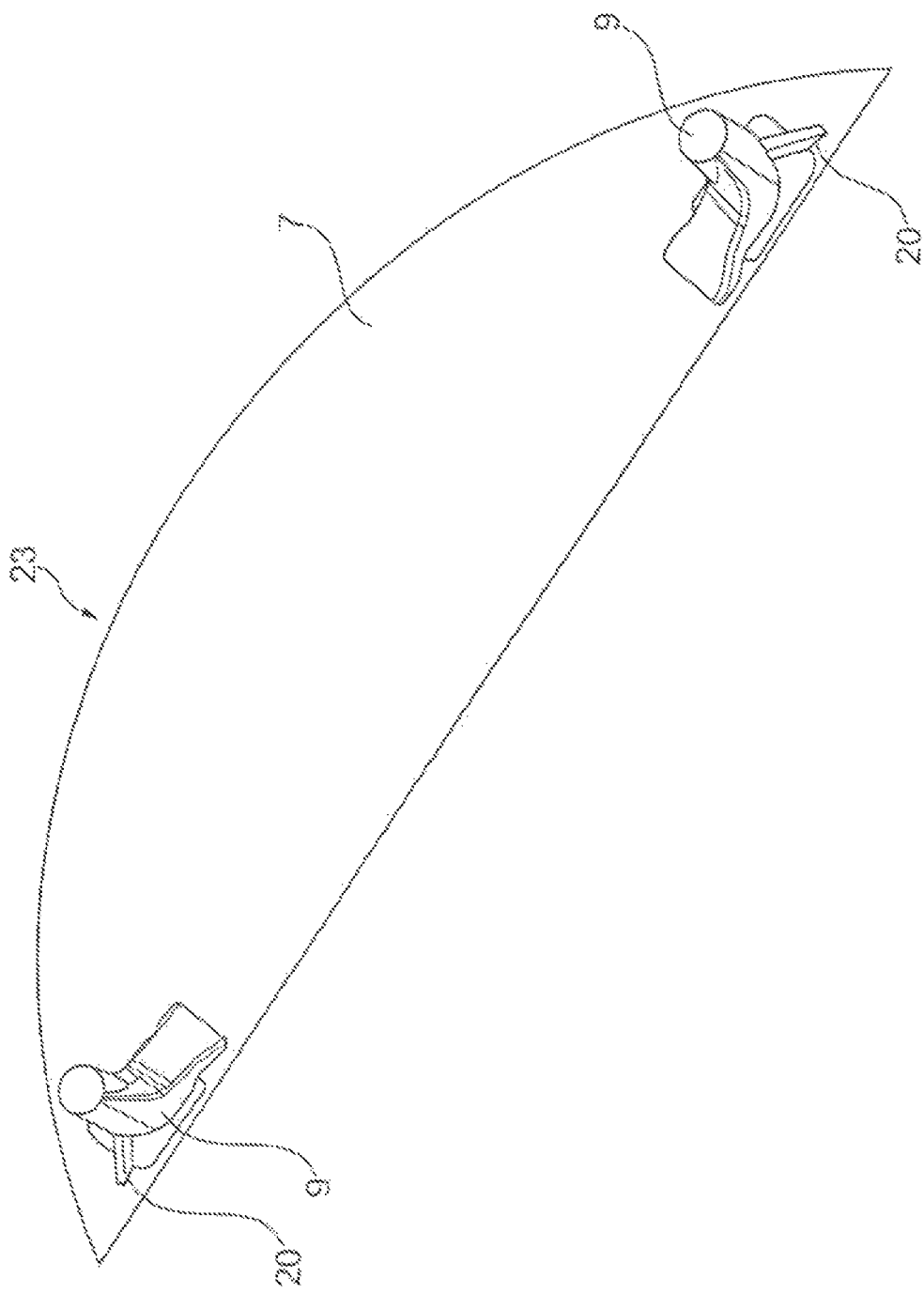
FIG. 4 shows a light guide.

FIG. 4 shows an exemplary light guide 7, which is configured approximately in the manner of a segment of a circle and has input coupling elements 9 which are arranged at the converging end regions 20 at a distance from one another. A diffuser element 11 having an approximately arcuate part 21 and an approximately straight part 22 is assigned to said extensive light guide 7, wherein the diffuser element 11 is arranged at an outer periphery 23 of the light guide 7 and in particular rests against it. This is also shown in FIG. 3. The approximately arcuate part 21 here can be, for example, a piece of a circle or be curved in a manner that deviates therefrom. The approximately straight part 22 can be straight or have an angle, such as in particular have an angle at the center and form a flat V, for example.

It is particularly advantageous here if the diffuser element 11 engages around the perimetric outer periphery 23 of the light guide 7. Alternatively, the diffuser element 11 can also merely rest against a side or only partially against the outer periphery 23 of the light guide. It is also possible for a plurality of diffuser elements 11 to be assigned to the light guide 7, which regionally rest against or abut the light guide.

Figure 6:
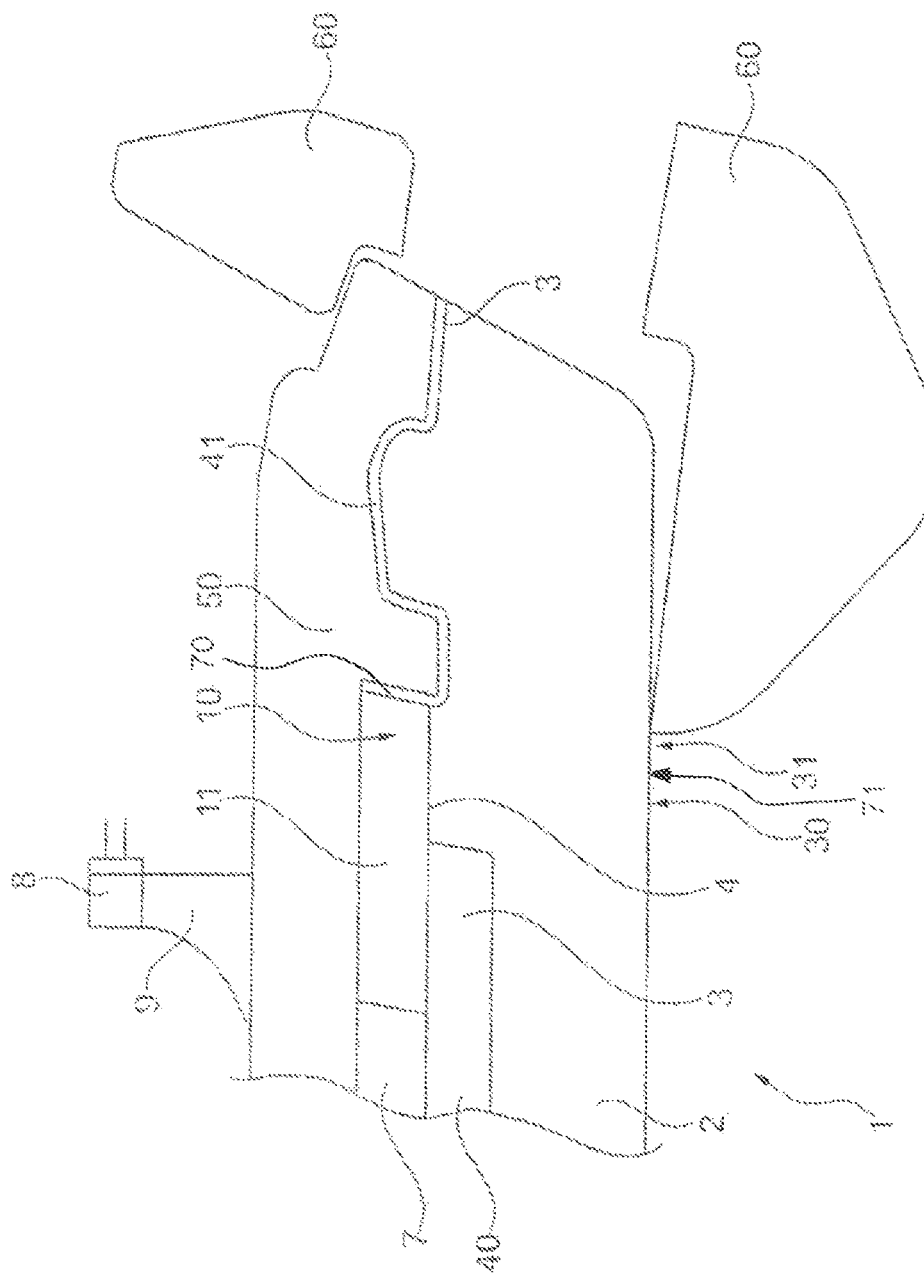
FIG. 6 shows a view of the radome in a partial section.

FIG. 6 shows a section through the radome 1, wherein only a radially outwardly located partial region thereof can be seen. The radome 1 has a front plate 2 made of a transparent material. This material can here in particular be a plastics material. The front plate 2 can also furthermore optionally be coated on its front side 30 with at least one coating 31 so as to have a scratch-resistant configuration. The extensive front plate 2 is transmissive, for example transparent.

Provided on the rear side of the front plate 2 is a layer 3 that does not transmit light and is at least partly or regionally sprayed on and/or lacquered or injection-molded on or adhesively bonded thereto. For example, regions can be provided with a sprayed-on plastics layer 40, wherein the transparent material of the front plate can also be injection-molded onto the layer that does not transmit light. Radially outwardly, a lacquered surface 41 which is configured such that it does not transmit light can be seen. At least one cutout 4 in the form of a light passage 10 is also formed in the layer 3 that does not transmit light, such as between the regions 40 and 41 in FIG. 6. Configured and arranged next to the cutout 4 is furthermore a reflective region 70, with the result that light from the light guide 7 or from the diffuser element can be reflected at the reflective region and is reflected in the direction of the front side of the front plate. The reflective region 70 of the front plate 2 is preferably a reflectively coated region of the surface of the front plate 2. The reflectively coated region 70 can be coated here with a metallic coating so as to obtain a permanently good reflective property.

FIG. 6 shows the configuration of the reflective region 70 of the front plate 2 in the form of a conical region which is arranged at a defined angle, in particular between 300 and 60°, with respect to the plane 71 which is at least substantially defined by the front plate 2. The angle is preferably in particular between 40° and 50°, in particular 450°.

It is also advantageous if the reflective region 70 of the front plate 2 is alternatively configured as a curved region which is tilted in particular relative to the plane 71 which is at least substantially defined by the front plate 2.

Arranged on the rear side of the front plate 2 of the radome 1 is, on the rear side of the layer 3 that does not transmit light, a substantially extensive light guide 7. Arranged next to the light guide and also in the region of the light passage 10 is optionally a diffuser element 11. The light is emitted by a light-emitting element 8, input into an input coupling element 9 and input into the light guide 7. From here, the light is fed into the diffuser element 11 and from here scattered to the reflective region 70, reflected here and then reflected through the light passage 10 to the front of the front plate 2. Here, the light exits on the front side and can thus represent a defined light structure. On the rear side, a cover 50 can be provided, which covers the front plate 2 with the light guide 7 and optional diffuser element 11.

The light guide 7 is preferably made of a transparent plastics material and the optional diffuser element is preferably made of a translucent plastics material.

With respect to the manufacturing of the light guide and of the diffuser element, they can be produced as separately configured parts and be placed in neighboring fashion at the rear side of the front plate 2. Alternatively, the light guide and the diffuser element can be formed as interconnected parts next to one another, which are produced together in particular by injection molding or are adhesively bonded together.

A termination element 60 can be provided on the peripheral side of the front plate, which termination element 60 is configured for example as a covering ring to cover an emission of light of the radially outer contour of the radome.

Figure 5:
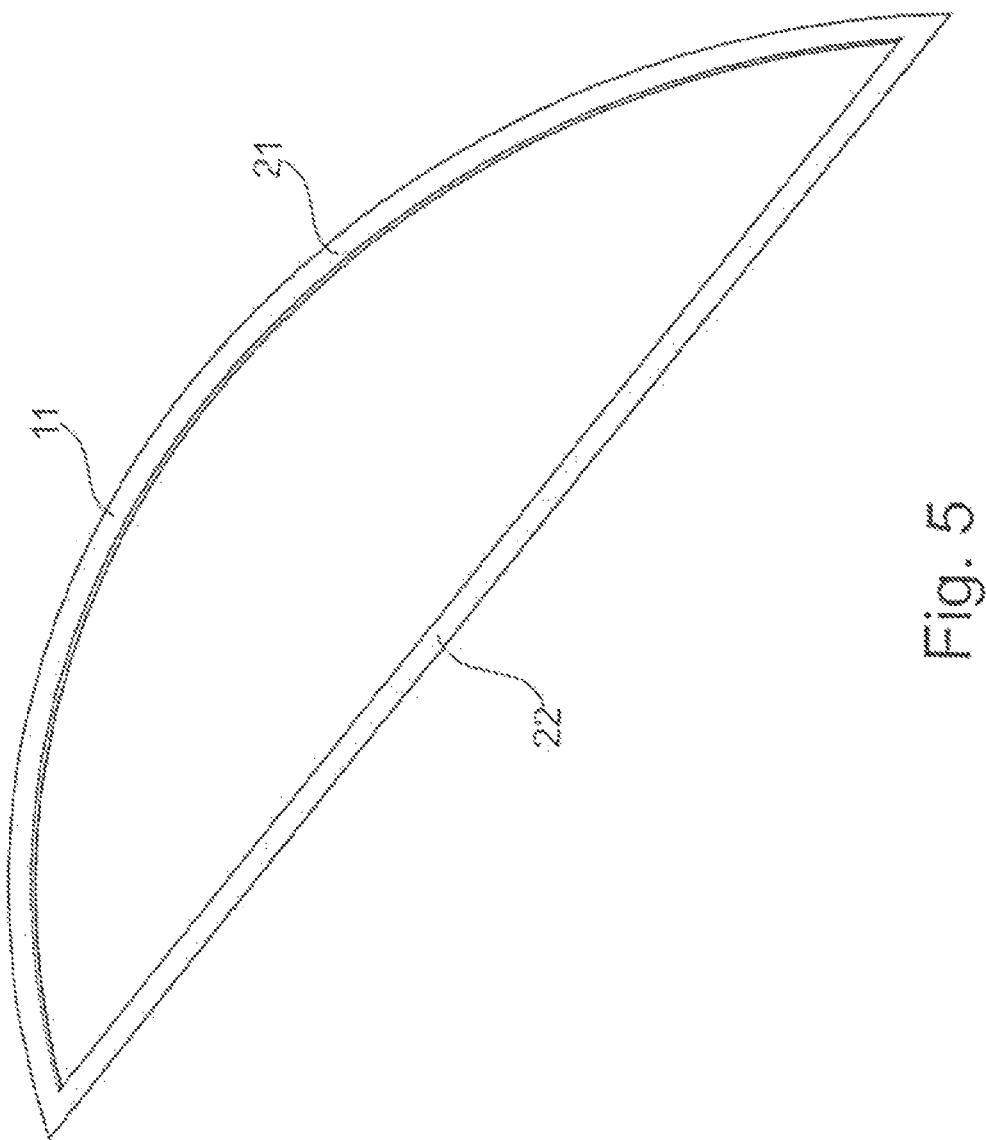
FIG. 5 shows a diffuser element.
Figure 7:
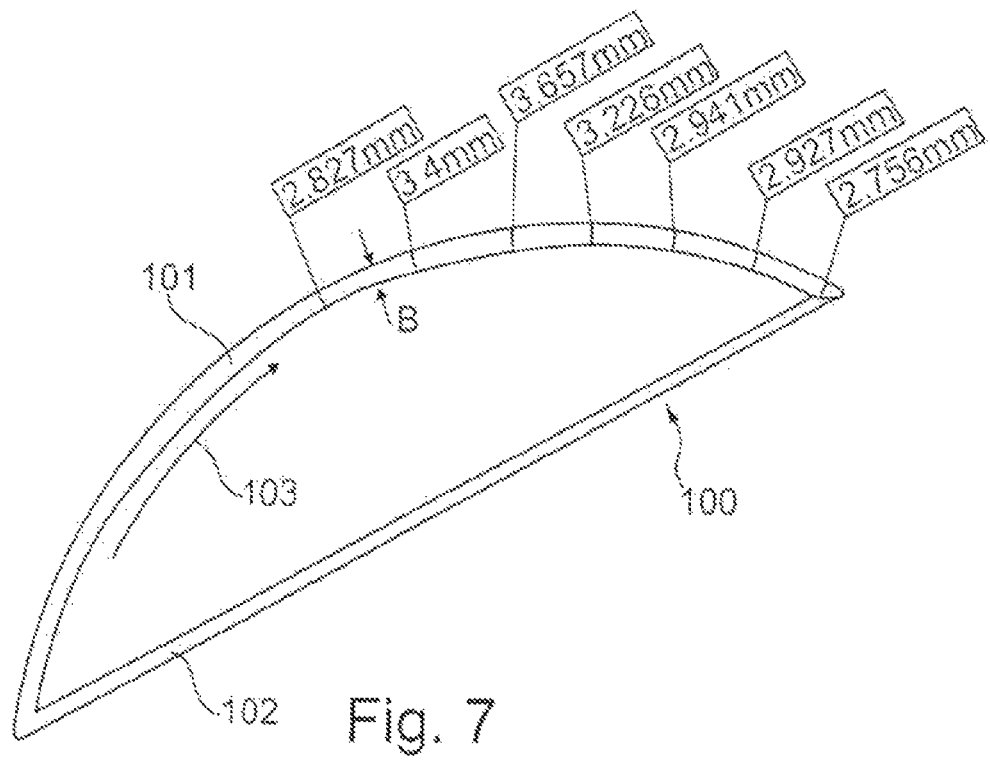
FIG. 7 shows a view of a diffuser element.
Figure 8:
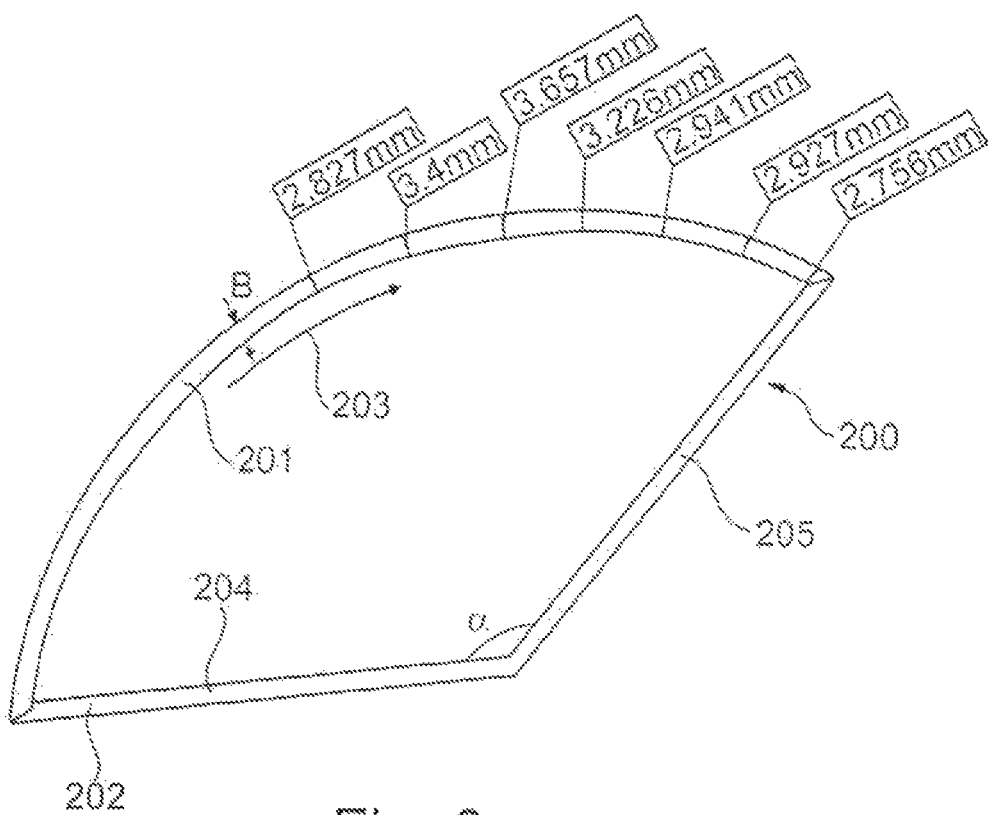
FIG. 8 shows a view of a further exemplary embodiment of a diffuser element.

FIGS. 7 and 8 show illustrations of alternative diffuser elements 100, 200, in which the diffuser element 100 corresponds to the diffuser element of FIG. 3 and of FIG. 5, respectively. The diffuser element 200 of FIG. 8 is a modification of the diffuser element 100 of FIG. 7.

The diffuser element 100 has a first bar 101 and a second bar 102, wherein the two bars 101, 102 are interconnected and form a frame-type shape. Said frame-type shape serves for holding a substantially extensive light guide so as to be able to produce a light-emitting structure along the extent of the diffuser element.

The diffuser element 100 has a first bent bar 101 and a straight bar 102. The bent first bar 101 has, along its longitudinal extent 103, a modulation of the width B in the direction perpendicular to the longitudinal extent 103. Said width B is situated in the plane that is defined by the diffuser element 100 and is typically also defined by the neighboring light guide.

It can be seen that the width B is modulated along the extent 103 of the first bar. The second bar 102 is of substantially straight configuration and has a constant width. Alternatively, this bar can also have a modulated width.

The diffuser element 200 has a first bar 201 and a second bar 202, wherein the two bars 201, 202 are interconnected and form a frame-type shape. Said frame-type shape serves for holding a substantially extensive light guide so as to be able to produce a light-emitting structure along the extent of the diffuser element 200.

The diffuser element 200 has a first bent bar 201 and an angled second bar 202. The bent first bar 201 has, along its longitudinal extent 203, a modulation of the width B in the direction perpendicular to the longitudinal extent 203. Said width B is situated in the plane that is defined by the diffuser element 200 and is typically also defined by the neighboring light guide.

It can be seen that the width B is modulated along the extent 203 of the first bar. The second bar 202 has two partial bars 204, 205, which are arranged at an obtuse angle α with respect to one another, wherein each partial bar 204, 205 has a substantially straight configuration and in each case an approximately constant width. Alternatively, the width of the partial bars or of at least one of the partial bars can also be modulated.

FIG. 9 shows a diagram in which is plotted the width B of the first bar 101, 201 along the longitudinal extent 103, 203. It can be seen that the width B is minimal at the respective ends, and a local minimum of the width B is present at the center of the longitudinal extent, wherein a local maximum can be found at approximately a third and two thirds of the longitudinal extent.

That is to say it can be seen that the width of the first bar 101, 201 is modulated along its longitudinal extent 103, 203.

LIST OF REFERENCE SYMBOLS 1 radome
2 front plate
3 layer that does not transmit light
4 cutout
5 straight bars
6 annular border
7 light guide
8 light-emitting element
9 input coupling element
10 light passage
11 diffuser element
20 converging end regions
21 approximately arcuate part
22 approximately straight part
23 outer periphery
30 front side
31 coating
40 plastics layer
41 lacquered surface
50 cover
60 termination element
70 reflectively coated region
71 plane 100 diffuser element
101 first bar
102 second bar
103 longitudinal extent
200 diffuser element
201 first bar
202 second bar
203 longitudinal extent
204 partial bar
205 partial bar

The invention claimed is:

1. A radome for covering a radar transmitter or radar sensor comprising
- a substantially extensive front plate configured to be transmissive to light on a front side, wherein the substantially extensive front plate has an opaque layer that does not transmit light arranged on a rear side, wherein the opaque layer has at least one cutout in the form of a light passage;
- a reflective region of the substantially extensive front plate, wherein the reflective region is arranged adjacent to the at least one cutout and reflects light into the cutout;
- at least one substantially extensive light guide arranged on the rear side adjacent to the layer that does not transmit light;
- at least one light-emitting element optically coupled to the at least one substantially extensive light guide such that light emitted by the at least one light-emitting element enters the at least one substantially extensive light guide and propagates through the at least one substantially extensive light guide; and
- at least one diffuser element arranged adjacent to the at least one substantially extensive light guide, wherein the diffuser element is arranged such that the light propagating through the at least one substantially extensive light guide enters the diffuser element, propagates through the diffuser element, exits the diffuser element, enters the substantially extensive front plate through the at least one cutout forming the light passage, and exits the substantially extensive front plate on the front side,
- wherein the reflective region is configured to reflect at least some of the light propagating through the diffuser element toward the cutout,
- wherein the diffuser element has a modulated width such that the width of the diffuser is not constant in its longitudinal extent the diffuser is in contact with the light guide in the width wise direction.

2. The radome as claimed in claim 1,
further comprising a plurality of substantially extensive light guides, wherein assigned to each of the plurality of substantially extensive light guides is at least one light-emitting element optically coupled to the light guide for feeding light into the light guide.

3. The radome as claimed in claim 1,
further comprising a plurality of substantially extensive light guides, wherein at least one diffuser element is assigned to each of the substantially extensive light guides.

4. The radome as claimed in claim 1,
wherein the diffuser element is arranged adjacent to an outer periphery of the at least one substantially extensive light guide and rests against said outer periphery.

5. The radome as claimed in claim 1,
wherein the diffuser element engages around a perimetric outer periphery of the at least one substantially extensive light guide.

6. The radome as claimed in claim 1,
wherein the diffuser element is formed from bars and has a frame-type shape, wherein the bars enclose a surface.

7. The radome as claimed in claim 1,
wherein the at least one substantially extensive light guide is made of a transparent plastics material and the diffuser element is made of a translucent plastics material.

8. The radome as claimed in claim 1,
wherein the at least one substantially extensive light guide and the diffuser element are placed to be next to one another in the form of separately configured parts.

9. The radome as claimed in claim 1,
wherein the at least one substantially extensive light guide and the diffuser element are arranged as interconnected parts in neighboring fashion.

10. The radome as claimed in claim 1,
further comprising a rear-side cover which covers the at least one substantially extensive light guide and the diffuser element arranged on the rear side of the substantially extensive front plate.

11. The radome as claimed in claim 2,
wherein assigned to each of the plurality of substantially extensive light guides are a plurality of light emitting elements.

12. The radome as claimed in claim 6,
wherein at least a first bar has a modulated width such that the width of the first bar is not constant in its longitudinal extent.

13. The radome as claimed in claim 12,
wherein the first bar has a curvature or forms an arc in its longitudinal extent.

14. The radome as claimed in claim 12,
wherein a second bar has a straight configuration or is formed from two straight partial bars that enclose an angle between them.

15. The radome as claimed in claim 9,
wherein the at least one substantially extensive light guide and the diffuser element are interconnected by way of injection molding or adhesive bonding.

* * * * *